United States Patent [19]

Kondo

[11] Patent Number: 5,191,496
[45] Date of Patent: Mar. 2, 1993

[54] TAPE CASSETTE HAVING A LID OPENED BY A FORCE IN THE SAME DIRECTION AS A TAPE LOADING FORCE

[75] Inventor: Yoshio Kondo, Tokyo, Japan
[73] Assignee: Sony Corporation, Tokyo, Japan
[21] Appl. No.: 675,166
[22] Filed: Mar. 26, 1991
[30] Foreign Application Priority Data Mar. 30, 1990 [JP] Japan .................................. 2-84304

[51] Int. Cl.$^5$ .......................................... G11B 23/087
[52] U.S. Cl. .................................................. 360/132
[58] Field of Search ................... 360/132, 85, 95, 96.5, 360/96.6; 242/198, 199

[56] References Cited

U.S. PATENT DOCUMENTS

| | | | |
|---|---|---|---|
| 4,021,006 | 5/1977 | Morimoto et al. | 360/132 |
| 4,050,087 | 9/1977 | Kishi | 360/132 |
| 4,497,008 | 1/1985 | Schoenmakers | 360/132 |
| 4,646,190 | 2/1987 | Meguro | 360/132 |
| 4,654,729 | 3/1987 | Yanagida et al. | 360/132 |

Primary Examiner—Robert S. Tupper
Attorney, Agent, or Firm—Lewis H. Eslinger; Jay H. Maioli

[57] ABSTRACT

A tape cassette comprises a housing, a pair of reels, and a mount mounting the reels for rotation in the housing. A recording tape is wound on the reels and extends therebetween for transport from one of the reels to the other. The housing is formed with an opening through which a transducer can gain access to the recording tape for recording or reproducing signals on or from the recording tape. A lid is provided, together with a pivot shaft pivotally connecting the lid to the housing so that the lid can be moved selectively between a first position closing the opening and a second position uncovering the opening. The lid is formed with an engagement portion displaced from the pivot shaft in such a manner that, when the tape cassette is seated by a seating force for playing in a cassette player, the lid moves from the first position to the second position in response to a force applied to the engagement portion, the force having a component substantially parallel to the seating force.

2 Claims, 13 Drawing Sheets

TAPE CASSETTE HAVING A LID OPENED BY A FORCE IN THE SAME DIRECTION AS A TAPE LOADING FORCE

BACKGROUND OF THE INVENTION

1. Field of the Invention

The present invention relates to a tape cassette having a lid disposed on a front open side of a cassette housing, the lid being normally biased to its closed state but being openable by application of an external force thereto. More particularly, the invention relates to a novel and highly effective tape cassette the lid of which is opened in response to an external force that is redirected as compared to the prior art so as to be better coordinated with other forces acting on the tape cassette.

2. Description of the Prior Art

There have heretofore been proposed various tape cassettes having a lid that is angularly movable upwardly into an open position, the lid being disposed at the front of a cassette housing for closing an opening therein, as disclosed for example in Japanese laid open utility model publication No. 55(1980)-40615.

One such conventional tape cassette is shown in FIGS. 9A through 9D. To load the tape cassette, denoted at 6, into a cassette loading unit 1a of a deck mechanism 1 of a recording and reproducing device, the cassette housing 6a of the tape cassette 6 is lowered. When the cassette housing 6a is thus lowered, a lid 7 which is pivotally supported on the cassette housing 6a for upward angular movement is lifted open by an engaging pin 61a on a lid raising member 61 mounted on a chassis of the cassette loading unit 1a.

The lid 7 of the tape cassette 6 is normally urged by a spring to close the front opening of the cassette housing 6a. Therefore, when the lid 7 is released from the engaging pin 61a, i.e., when the cassette housing 6a is not depressed, the lid 7 is closed.

Since the lid of the conventional tape cassette is opened when it is pushed upwardly, the lid cannot be opened with a large degree of freedom. That is, the lid cannot be opened while the tape cassette is being loaded in the cassette loading unit unless a complex mechanism is employed. Because the cassette housing is subjected to upward forces by the engaging pin 61a, the tape cassette tends to be lifted in its entirety with respect to the cassette loading unit while the lid is being opened. Therefore, the cassette housing must be forced down by application of a force that is large enough to overcome the force tending to lift the tape cassette, namely the force due to the spring that normally urges the lid in the closed direction. For this reason, the cassette loading unit is required to have a relatively powerful cassette presser mechanism, making the deck mechanism, which includes the cassette loading unit, difficult to simplify in structure and reduce in size and weight.

OBJECTS AND SUMMARY OF THE INVENTION

In view of the problems of the conventional tape cassettes described above, it is an object of the present invention to provide a tape cassette having a lid that can be opened with a greater degree of freedom, with the result that a loading unit of a recording and reproducing device for loading the tape cassette is simplified in structure and reduced in size and weight.

The foregoing and other objects are attained in accordance with the invention by the provision of a tape cassette comprising: housing means; a pair of reels; means mounting the reels for rotation in the housing means; a recording medium wound on the reels and extending therebetween for transport from one of the reels to the other; the housing means being formed with an opening through which transducer means can gain access to the recording medium for recording or reproducing signals on or from the recording medium; lid means; and connection means movably connecting the lid means to the housing means so that the lid means can be moved selectively between a first position closing the opening and a second position uncovering the opening; the lid means being formed with an engagement portion displaced from the connection means in such a manner that, when the tape cassette is seated by a seating force for playing in a cassette player, the lid means moves from the first position to the second position in response to a force applied to the engagement portion, the force having a component substantially parallel to the seating force.

In its preferred embodiment, a tape cassette constructed in accordance with the invention has a lid that is openable by being angularly moved upwardly, the lid being disposed at the front open side of a cassette housing, the arrangement being such that the lid can be opened in response to depression of an engaging portion that extends rearwardly from a portion of the lid that is pivotally attached to the cassette housing. While the tape cassette is being loaded in a recording and reproducing device, the lid is opened by the application of a downward force, and at the same time, in order to seat the cassette for recording or reproducing, other downward forces are applied to the cassette housing, which thus shows no untoward tendency to rise. A cassette presser mechanism which is disposed in the cassette loading unit of the recording and reproducing device can be simplified, and the lid can be opened and closed efficiently in the cassette loading unit. Consequently, the recording and reproducing device can be designed with greater flexibility.

It is not necessary that the connection between the lid and the cassette housing be a pivoting connection, although a pivoting connection is preferred.

It is also not necessary that the lid open upwardly and the downward opening force be applied at a point to the rear of the pivot. Alternatively, the lid may open by being pivoted downwardly, and the opening force may be applied to the lid at a position forward of the pivot.

When the tape cassette is loaded into the cassette loading unit, the lid of the tape cassette is opened by the lid opening and closing member, which pushes the engaging portion downwardly. Even with the tape cassette loaded in the cassette loading unit, the lid can be closed when the engaging portion is released from the lid opening and closing member. Therefore, as the tape cassette is loaded in the cassette loading unit, the lid can be opened and closed with a great degree of flexibility. As with the conventional tape cassettes, the lid of the preferred embodiment of a tape cassette constructed in accordance with the invention can also be opened when pushed upwardly near the front thereof (i.e., forward of the pivot axis). The tape cassette is thus compatible with a conventional cassette player the operation of which is illustrated schematically in FIGS. 9A through 9D.

Since the lid is automatically closed when it is released from the downward depression, the lid opening and closing member of the cassette loading unit is simple in structure.

A better understanding of the objects, features and advantages of the invention can be gained from the following detailed description of the preferred embodiment thereof in conjunction with the appended drawings, wherein each reference character denotes the same element or part in each figure where it is employed.

DESCRIPTION OF THE PREFERRED EMBODIMENTS

Figure 1:
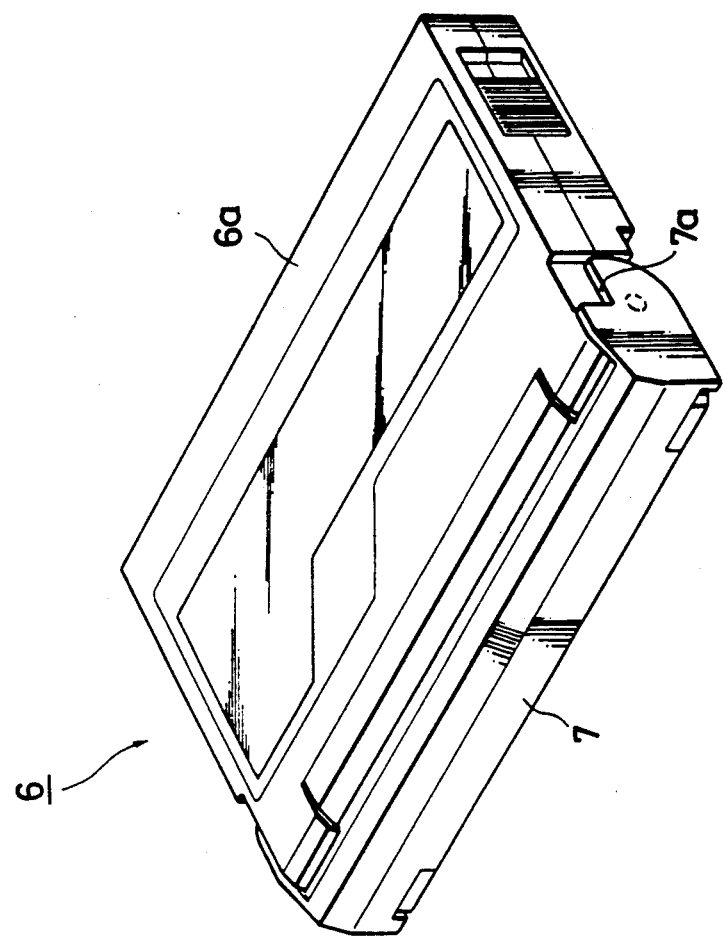
FIG. 1 is a perspective view, from a front-upper-right vantage point, of a tape cassette according to an embodiment of the present invention, the cassette being shown in its closed state.
Figure 2:
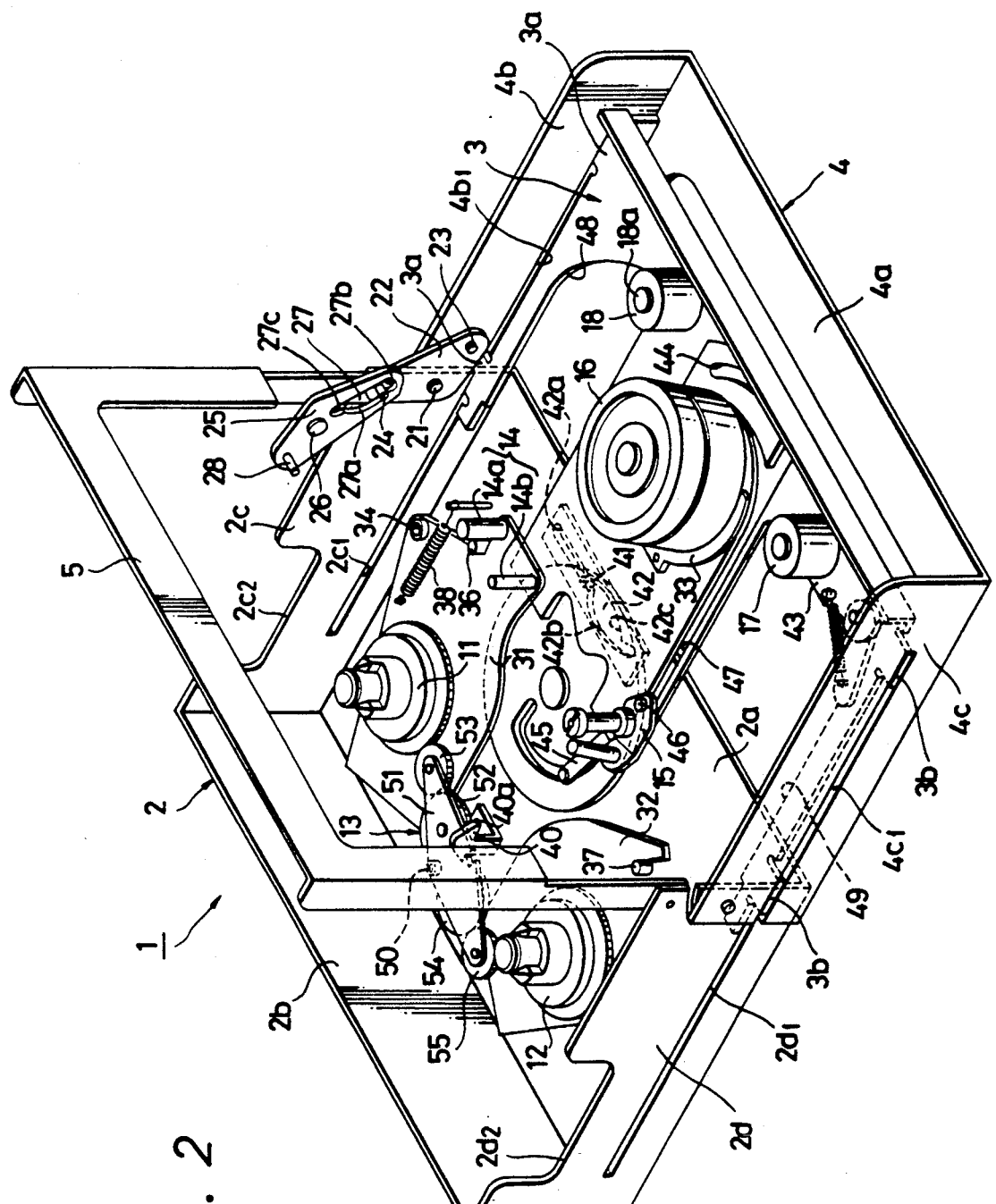
FIG. 2 is a perspective view, from a front-upper-left vantage point, of a magnetic recording and reproducing device that employs the tape cassette according to the present invention, the device being shown in its open state.
Figure 3:
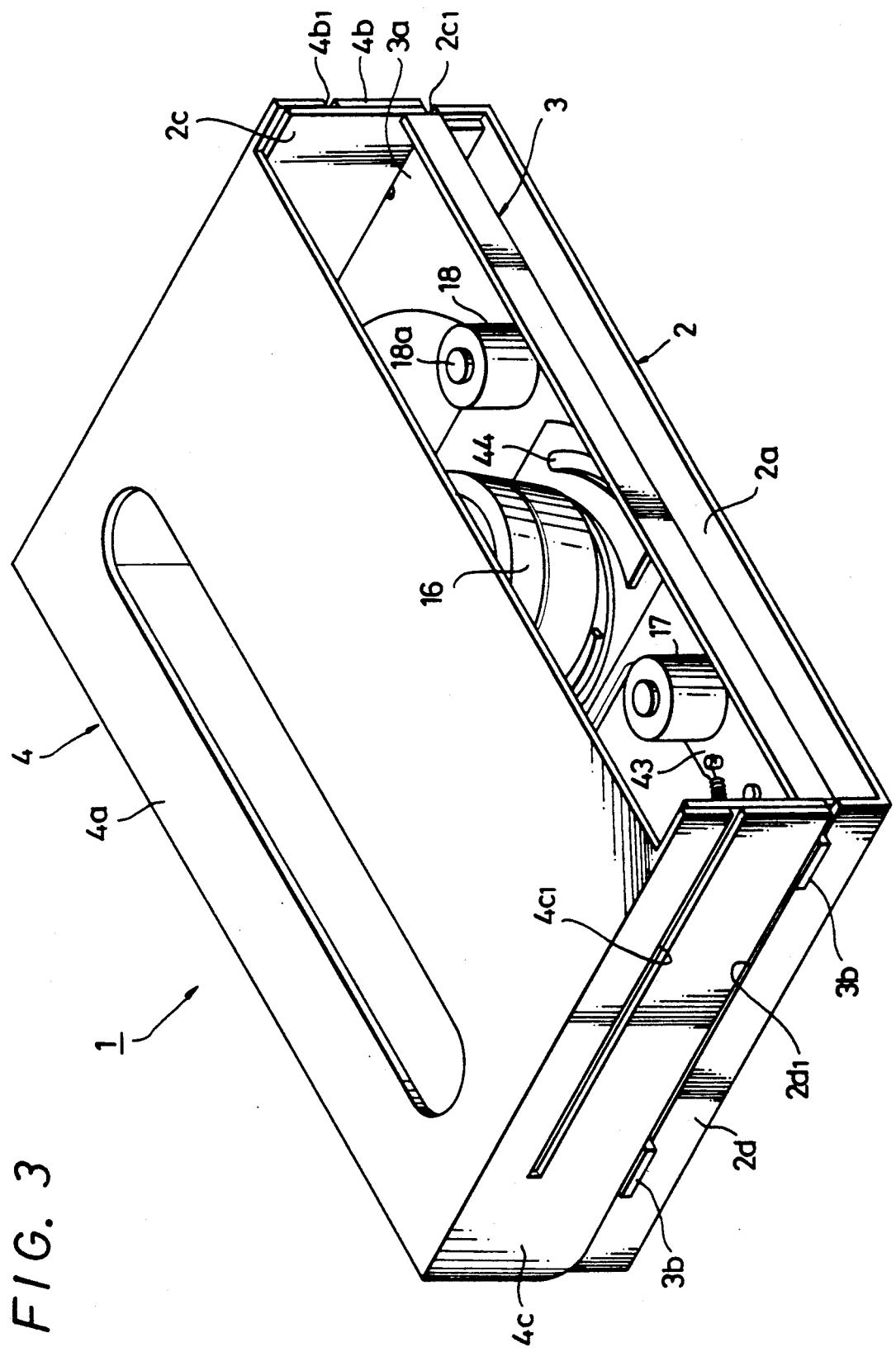
FIG. 3 is a perspective view, from a front-upper-left vantage point, of the magnetic recording and reproducing device of FIG. 2 in its closed state.

FIG. 2 shows a magnetic recording and reproducing device that employs a tape cassette according to the present invention. In that figure, a magnetic recording and reproducing device having a rotary head, e.g., a videotape recorder (VTR) such as an 8-mm VTR, includes a deck mechanism 1. The deck mechanism 1 comprises a first chassis 2 which is of substantially the same size as an 8-mm tape cassette when viewed in plan, a second chassis 3 in the form of a plate supported on the first chassis 2 and slidable into and out of the first chassis 2, and a third chassis 4 which is of substantially the same size as the first chassis 2. The first chassis 2 is in the form of a casing which is composed of a lower panel 2a, a rear wall panel 2b, and a pair of side wall panels 2c, 2d and the third chassis 4 is in the form of a lid which is composed of an upper panel 4a and a pair of side wall panels 4b, 4c. The side wall panels 4b, 4c of the third chassis 4 are pivotally coupled at their rear ends to the front ends of the side wall panels 2c, 2d of the first chassis 2 so that the third chassis 4 is angularly movable toward and over the first chassis 2 to close the upper open side thereof, as shown in FIG. 3, and away from the first chassis 2 to open the upper side thereof, as shown in FIG. 2. When the third chassis 4 is angularly moved away from the first chassis 2 until the third and first chassis 4, 2 are held in planar alignment with each other, the second chassis 3 can slide from the first chassis 2 into the third chassis 4, as shown in FIG. 2.

The deck mechanism 1 also includes a cassette presser frame 5 pivotally coupled to the front ends of the side wall panels 2c, 2d of the first chassis 2 at its front open side. The cassette presser frame 5 is angularly movable toward and over the upper open side of the first chassis 2 (see for example FIGS. 2, 4A and 4B) for holding a tape cassette 6 (FIGS. 4A, 6 and 7) which is stored in the first chassis 2.

To allow the second chassis 3 to slide from the first chassis 2 to the third chassis 4 when the third chassis 4 is angularly moved away from the first chassis 2, the side wall panels 2c, 2d of the first chassis 2 have respective guide slots 2c1, 2d1 formed therein, and the second chassis 3 has pairs of tongues 3a, 3b projecting from opposite side edges thereof and slidably riding in the respective guide slots 2c1, 2d1. The side wall panels 4b, 4c of the third chassis 4 also have respective guide slots 4b1, 4c1 formed therein which are linearly aligned with the respective guide slots 2c1, 2d1 of the first chassis 2 when the third chassis 4 is angularly moved away from the first chassis 2 so as to be in planar alignment therewith. Therefore, the second chassis 3 moves from the first chassis 2 to the third chassis 4 as the tongues 3a, 3b slide out of the guide slots 2c1, 2d1 and into the guide slots 4b1, 4c1.

The first chassis 2 houses therein a supply reel support 11 and a take-up reel support 12, a reel support drive mechanism 13 for selectively driving the supply and take-up reel supports 11, 12, a tape guide post assembly 14 including first and second tape guide posts 14a, 14b, and a tape loading mechanism 15. The second chassis 3 supports thereon a rotary head drum 16 incorporating a drive motor and recording and reproducing heads, a pinch roller 17, and an impedance roller 18.

A first link 22 is angularly movably supported on a shaft 21 by which the third chassis 4 is pivotally coupled to the first chassis 2. The first link 22 has an end fixed to the side wall panel 4b of the third chassis 4 by a pin 23, so that the first link 22 is angularly movable in unison with the third chassis 4. The opposite end of the first link 22 supports an engaging pin 24. A second link 25 is pivotally supported at its central portion on one of the pivoted ends of the cassette presser frame 5 by a shaft 26. The second link 25 has a groove 27 defined in a portion thereof on one side of the shaft 26, and the engaging pin 24 is movably received in the groove 27. The second link 25 supports a presser pin 28 on an end thereof on the other side of the shaft 26, remote from the groove 27.

The groove 27 includes a relief portion 27a in which the engaging pin 24 slides as the first link 22 turns in unison with the third chassis 4 when the third chassis 4 is angularly moved away from the first chassis 2, thereby opening the first chassis 2; a disengaging portion 27b from which the engaging pin 24 is released and freed when the third chassis 4 is angularly moved away from the first chassis 2 so as to be in planar alignment therewith; and an engaging portion 27c which is engaged and pushed by the engaging pin 24 when the third chassis 4 is angularly moved toward and over the first chassis 2, thereby closing the first chassis 2.

Figure 4A:
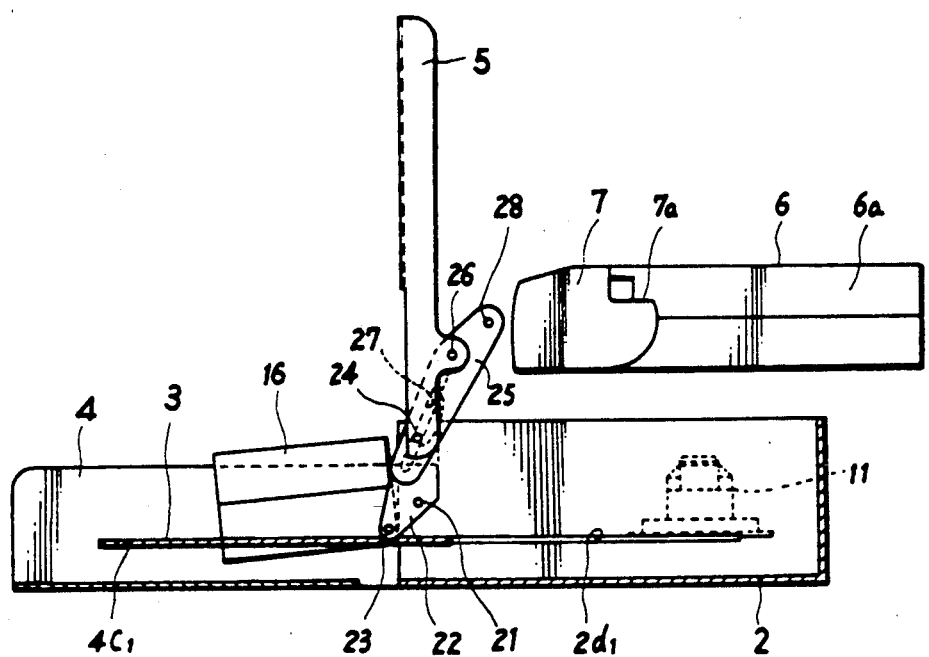
FIGS. 4A through 4F are cross-sectional views in a vertical plane parallel to the front-to-back direction of both the tape cassette and the magnetic recording and reproducing device, showing the manner in which the several chassis of the magnetic recording and reproducing device operate.

When the third chassis 4 is angularly moved away from the first chassis 2 so as to be in planar alignment therewith, thus opening the first chassis 2, and also when the cassette holder frame 4 is raised into a substantially vertical position, the second link 25 assumes an erected position, moving the presser pin 28 upwardly with respect to the first chassis 2, as shown in FIG. 4A.

The tape cassette 6 is now loaded into the first chassis 2, so that reels in the cassette housing 6a of the tape cassette 6 are engaged respectively by the reel supports 11, 12.

Figure 4B:
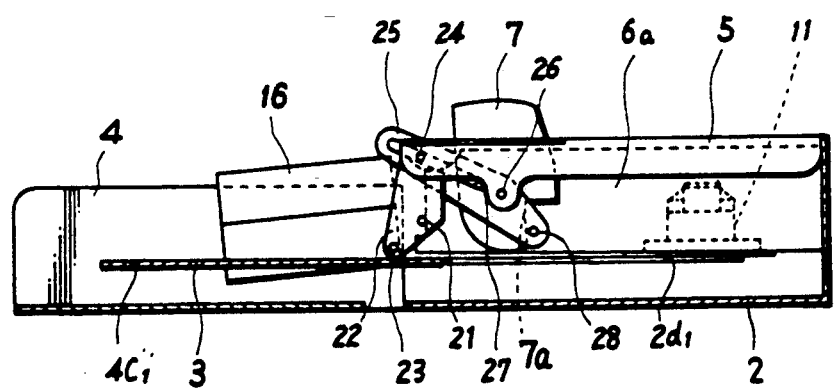

Then, as shown in FIG. 4B, the cassette presser frame 5 is angularly moved downwardly over the upper open side of the first chassis 2, thereby pressing the loaded tape cassette 6. The second link 25 is also turned downwardly to cause the presser pin 28 to engage and press downwardly an arm or engaging portion 7a projecting rearwardly from a pivoted portion of a lid 7 of the tape cassette 6. The lid 7 is thus turned upwardly, opening the tape cassette 6. When the cassette presser frame 5 is further angularly moved downwardly until it completely presses the tape cassette 6, the second link 25 is further turned to enable the presser pin 28 to raise the lid 7 to its fully erected open position.

Figure 4C:
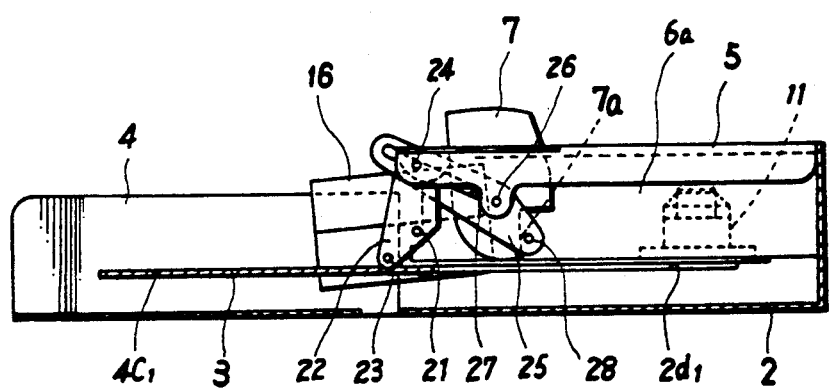
Figure 4D:
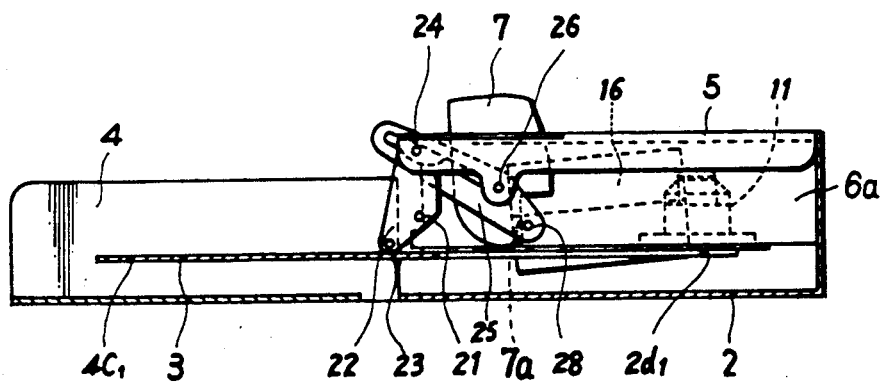

Thereafter, the second chassis 3 is moved from the third chassis 4 toward the first chassis 2, as shown in FIGS. 4C and 4D, thereby inserting the rotary head drum 16, the pinch roller 17, and the impedance roller 18 through the open side of the tape cassette 6 into the dead space in the cassette housing 6a of the tape cassette 6.

Figure 4E:
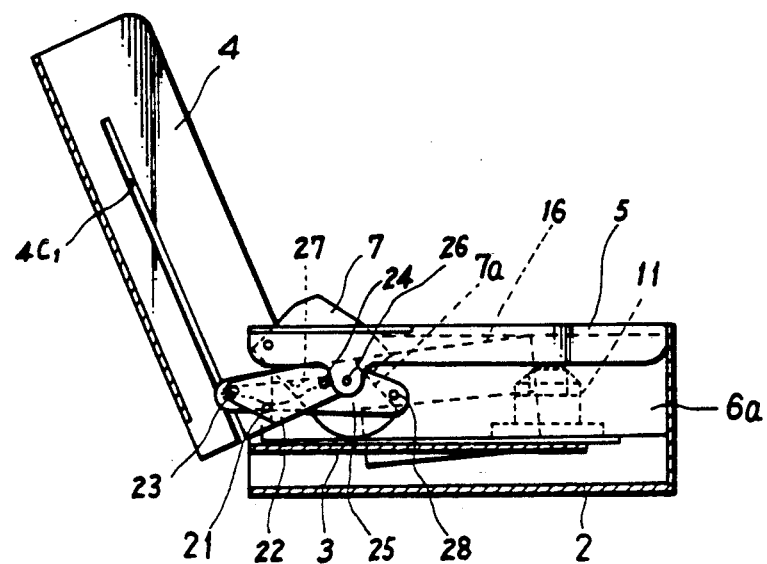
Figure 4F:
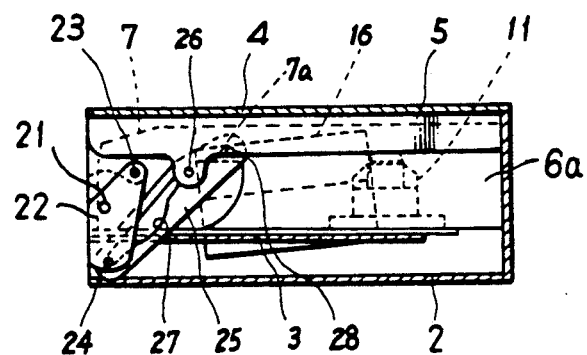

When the third chassis 4 is then angularly moved toward and over the first chassis 2 to close the first chassis 2, the first link 22 is turned in unison with the third chassis 4. The engaging pin 24 on the first link 22 slides into pushing engagement with the engaging portion 27c of the groove 27 of the second link 25. The second link 25 is now turned about the shaft 26 in a direction to elevate the presser pin 28 out of pressing engagement with the lid 7 of the tape cassette 6. The lid 7 now starts to be automatically closed under the bias which normally urges the lid 7 to be closed, as shown in FIG. 4E. When the third chassis 4 fully closes the first chassis 2, the second link 25 is pushed by the first link 22 to further elevate the pin 28, thereby fully releasing the lid 7. The lid 7 now fully closes the open side of the tape cassette 6, as shown in FIG. 4F. Then, the tape in the tape cassette 6 is loaded around the rotary head drum 16.

When the third chassis 4 is thereafter angularly moved back to open the first chassis 2, the second link 25 is turned by the first link 22 to displace the presser pin 28 downwardly. The presser pin 28 presses the arm 7a of the lid 7 of the tape cassette 6, whereupon the lid 7 starts to open the tape cassette 6. When the third chassis 4 is angularly moved away from the first chassis 2 until the third chassis 4 is positioned in planar alignment with the first chassis 2, the lid 7 is in the fully open position, thus fully opening the tape cassette 6. The second chassis 3 can now move from the first chassis 2 toward the third chassis 4, displacing the rotary head drum 16, the pinch roller 17, and the impedance roller 18 out of the dead space in the tape cassette 6.

The cassette presser frame 5 is then turned to the vertical position. The second link 25 is turned upwardly in unison with the cassette presser frame 5, so that the lid 7 is released from the presser pin 28, thereby closing the tape cassette 6. The closed tape cassette 6 can be removed from the first chassis 2.

During the operation described above, the second chassis 3 is smoothly guided, without any swinging movement, between the first and third chassis 2, 4 by the tongues 3a, 3b of the second chassis 3, which slide along the guide slots 2c1, 2d1, 4b1, 4c1 that are linearly aligned when the third chassis 4 is fully pivoted away from the first chassis 2 so as to be in planar alignment therewith.

As described above, the rotary head drum 16 is mounted on the second chassis 3. The supply and take-up reel supports 11, 12 in the first chassis 2 are rotatably mounted respectively on reel support chassis 31, 32.

As shown in FIGS. 2 and 5A through 5D, the reel support chassis 31, 32 are mounted on the lower panel 2a of the first chassis 2 in laterally spaced relation to each other, so that they are located one on each side of the rotary head drum 16 when it is displaced into the first chassis 2. The reel support chassis 31, 32 are positioned at substantially the same height as a head drum base 33 by which the rotary head drum 16 is mounted on the second chassis 3. The reel support chassis 31, 32 are angularly movably supported on the lower panel 2a by respective shafts 34, 35 which are equidistantly spaced from the axes of the reel supports 11, 12, respectively.

The reel support chassis 31, 32 are normally urged to turn into engagement with respective stopper pins 36, 37 by tension springs 38, 39 so that the reel supports 11, 12 normally remain spaced from each other by a predetermined distance The first and second tape guide posts 14a, 14b of the tape guide post assembly 14, which are spaced from each other, are vertically disposed on a front edge of the reel support chassis 31.

Figure 5A:
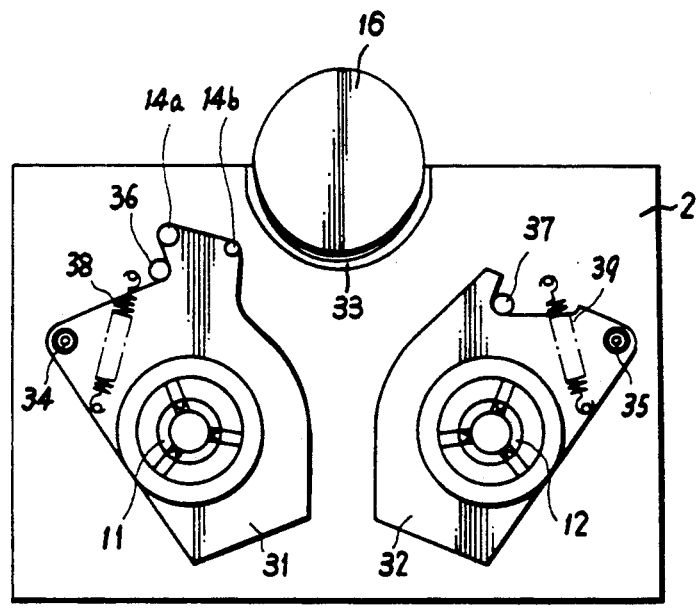
FIGS. 5A through 5D are top plan views showing the manner in which reel supports mounted on the magnetic recording and reproducing device are displaced by a rotary head drum also mounted on the magnetic recording and reproducing device.

When the reel supports 11, 12 and the rotary head drum 16 are thus arranged and the second chassis 3 is displaced toward the third chassis 4 that has been angularly moved away from the first chassis 2, the rotary head drum 16 is spaced forwardly from the reel supports 11, 12, as shown in FIGS. 2 and 5A.

Figure 5B:
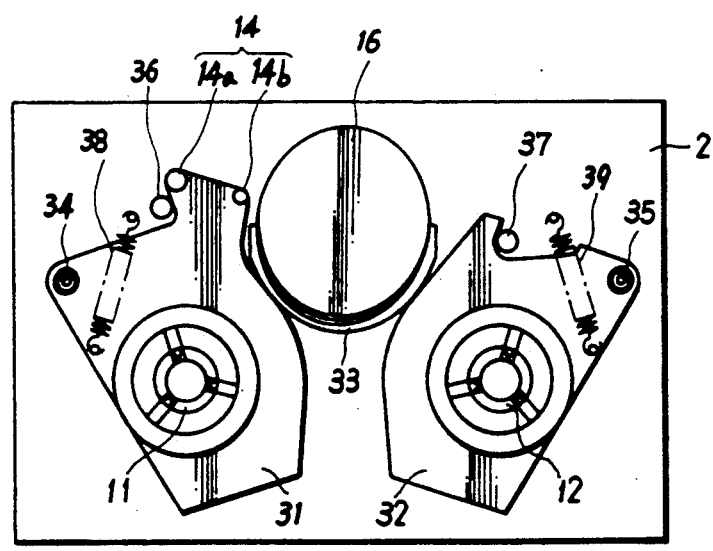
Figure 5C:
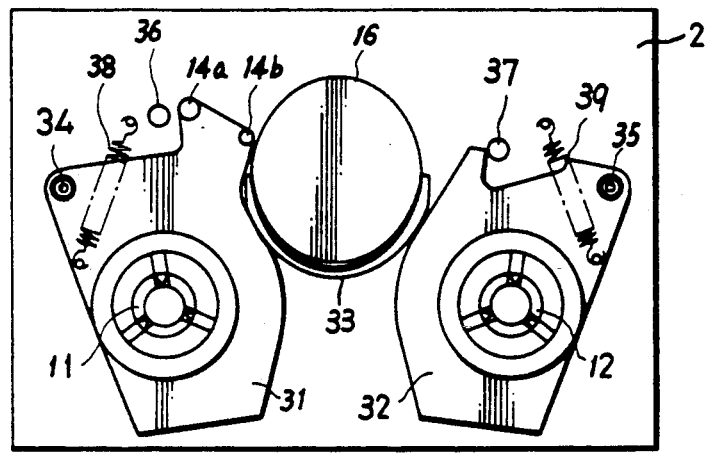
Figure 5D:
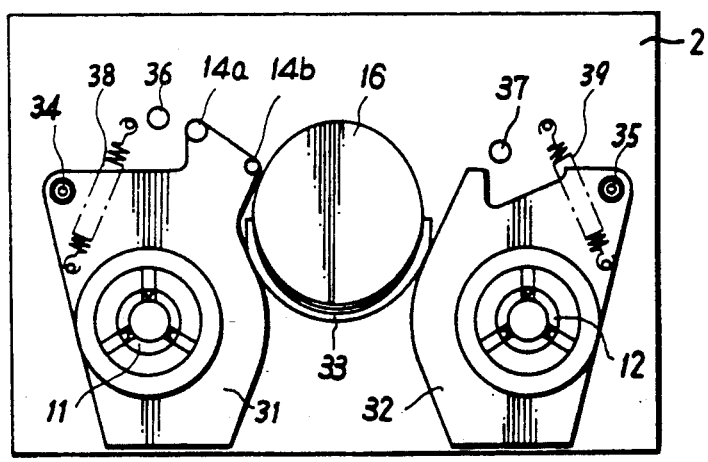

When the second chassis 3 is moved into the first chassis 2, the rotary head drum 16 is moved with the second chassis 3 toward the reel supports 11, 12 in the first chassis 2, until an end face of the head drum base 33 abuts respective inner end faces of the reel support chassis 31, 32, as shown in FIG. 5B. Continued movement of the second chassis 3 into the first chassis 2 causes the head drum base 33 to push the reel support chassis 31, 32 against the bias of the springs 38, 39. The reel support chassis 31, 32 are now turned respectively clockwise and counterclockwise about the respective shafts 34, 35, as shown in FIG. 5C. When the second chassis 3 is fully moved into the first chassis 2, the reel support chassis 31, 32, are angularly displaced away from each other toward their limit positions by the head drum base 33, thus increasing the distance between the reel supports 11, 12. The rotary head drum 16 is now positioned between the reel supports 11, 12, as shown in FIG. 5D.

Figure 6:
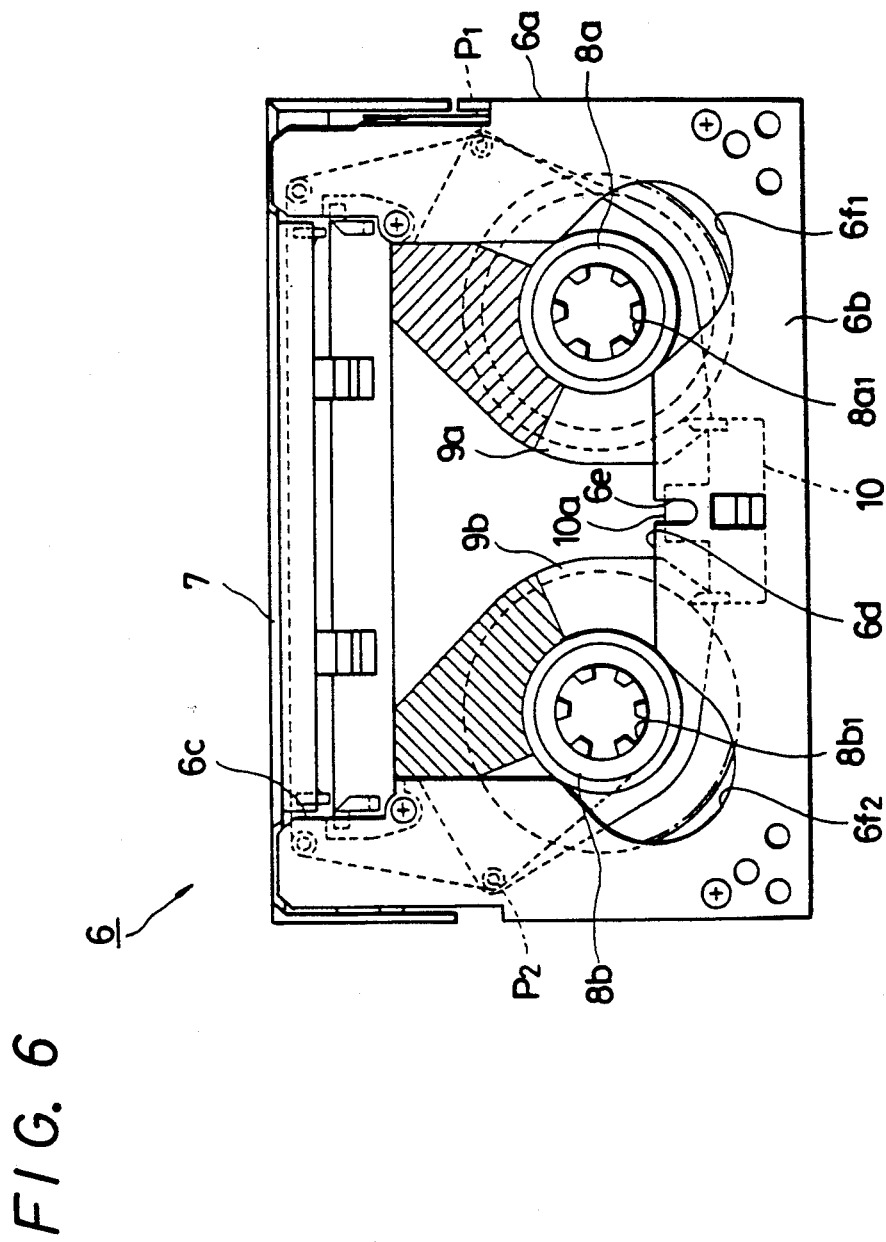
FIG. 6 is a bottom plan view of the tape cassette of FIG. 1, portions thereof being omitted for the sake of clarity.
Figure 7:
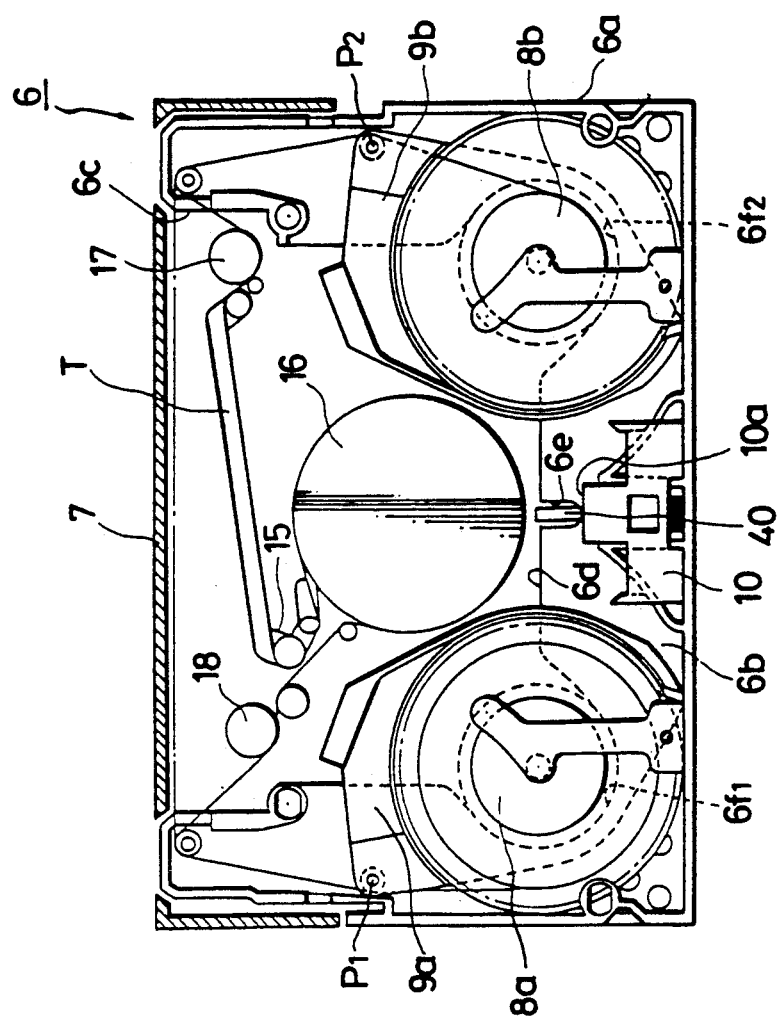
FIG. 7 is a top plan view of the tape cassette showing the manner in which it cooperates with a rotary head drum, an upper portion of the tape cassette being omitted from the illustration for the sake of clarity.

The tape cassette 6 has a supply reel 8a and a take-up reel 8b which are housed in the cassette housing 6a, as shown in FIGS. 6 and 7. The supply and take-up reels 8a, 8b are movable in certain directions from their predetermined positions. Specifically, the supply and take-up reels 8a, 8b are spaced a predetermined distance from each other and locked in their predetermined positions under a normal condition. When the supply and take-up reels 8a, 8b are unlocked, they are movable in the same directions as the directions in which the reel supports 11, 12 are movable.

When the third chassis 4 is angularly moved away from the first chassis 2 so as to be in planar alignment therewith, thus opening the first chassis 2, and when in addition the second chassis 3 is moved into the third chassis 4 and the cassette presser frame 5 is erected, the first chassis 2 is rendered open, the rotary head drum 16 being displaced out of the first chassis 2. Under this condition, the reel supports 11, 12 in the first chassis 2 are positioned in normally spaced relationship to each other, i.e., the reel supports 11, 12 are spaced from each other by a predetermined distance, the reel support chassis 31, 32 being held against the respective stopper pins 36, 37 under the bias of the springs 38, 39.

When the tape cassette 6 is then loaded into the first chassis 2, the reels 8a, 8b in the tape cassette 6 are engaged by the respective reel supports 11, 12 and unlocked by an unlocking member 40 in the first chassis 2.

Then the cassette presser frame 5 is turned downwardly to press the tape cassette 6 loaded in the first cassette 2. As described above, the second link 25 is turned to cause the presser pin 28 to press the arm 7a of the lid 7, which is turned to open the tape cassette 6, i.e., the front open side of the cassette housing 6a.

After the tape cassette 6 is opened, the second chassis 3 is moved into the first chassis 2. The rotary head drum 16 on the second chassis 3 is inserted into the tape cassette 6 through the front open side thereof. Upon insertion of the rotary head drum 16, the head drum base 33 engages and presses the reel support chassis 31, 32, thereby angularly displacing the reel supports 11, 12 away from each other against the resiliency of the springs 38, 39. The reels 8a, 8b in the tape cassette 6 are also displaced away from each other in unison with the reel supports 11, 12. Accordingly, the space in the tape cassette 6 available to accommodate the rotary head drum 16 and associated apparatus is increased. The rotary head drum 16 enters the augmented space and is fully inserted into the tape cassette 6.

The third chassis 4 is then angularly moved toward and over the first chassis 2. As described before, the second link 25 with its presser pin 28 releases the lid 7, which is spring-biased so that it automatically closes the front open side of the tape cassette 6. The lid 7 is now positioned within the same plane as the cassette housing 6a. Consequently, the third chassis 4 is neatly held against the first chassis 2 in fully superposed relation, thus completely closing the upper open side of the first chassis 2. The third and first chassis 4, 2 thus combined together are of substantially the same size and shape as the loaded tape cassette 6.

The second chassis 3 is moved by a drive motor (not shown) disposed in the first chassis 1. The second chassis 3 has a groove 42 in which there engages a pin 41 that is circumferentially movable by the drive motor. The groove 42 includes an actuating portion 42a in which the pin 41 slides to move the second chassis 3 when the pin 41 is circumferentially moved by the drive motor, and relief portions 42b, 42c in which the pin 41 moves idly when the tape in the tape cassette 6 is loaded around the rotary head drum 16 and also when the tape cassette 6 is unlocked for ejection.

The pinch roller 17, which is located on one side of the rotary head drum 16, is rotatably supported on a pinch roller arm 43 of the second chassis 3. The impedance roller 18, which is located on the other side of the rotary head drum 16, is rotatably supported on the second chassis 3 by a shaft 18a. The second chassis 3 has an arcuate guide slot 44 positioned near and extending partly around the rotary head drum 16, the tape loading mechanism 15 being movable in the arcuate guide slot 44. The second chassis 3 also has a straight transverse relief slot 47 receiving a shaft 46 of a loading arm 45 on which the tape loading mechanism 15 is supported, and relatively large transverse recesses 48, 49 (FIG. 2) positioned on the opposite sides, respectively, of the rotary head drum 16 for receiving the shafts of the reel supports 11, 12, respectively, when the second chassis 3 is moved into the first chassis 2.

The reel support drive mechanism 13, which is disposed in the first chassis 2 for selectively transmitting drive forces to the reel supports 11, 12 comprises a support plate 51 having a central bearing 50 thereon; a pair of inner larger gears 52, 54 rotatably mounted on the support plate 51, one on each side of the bearing 50; and a pair of outer smaller gears 53, 55 rotatably mounted on respective outer ends of the support plate 51 and held in mesh with the larger gears 52, 54, respectively. The outer smaller gears 53, 55 can selectively alternatively be brought into mesh with respective gears 11a, 12a of the reel supports 11, 12 when the support plate 11 is angularly moved or swings about its central bearing 50.

Since the reel support drive mechanism 13 has four gears 52, 53, 54, 55, it can reliably transmit drive forces to the reel supports, 11, 12 even when the relatively movable reel supports 11, 12 are spaced the maximum distance from each At the same time, the gears 52-55 can be made relatively small and light.

The side wall panels 2c, 2d of the first chassis 2 have respective recesses 2c2, 2d2 formed in upper rear edges thereof for easy insertion and removal of the tape cassette 6 into and out of the first chassis 2.

The unlock member 40 for unlocking the reels 8a, 8b in the tape cassette 6 which is loaded in the first chassis 2 has a substantially triangular presser 40a which is inserted upwardly into the cassette housing 6a of the loaded tape cassette 6 to push in the unlocking direction a lock member which locks the reels 8a, 8b.

The second chassis 3, the rotary head drum 16, the tape loading mechanism 15, and the reel supports 11, 12 are actuated by an ordinary conventional actuator mechanism including a motor, speed reducer gears, and other known components. Therefore, the actuator mechanism is omitted from the illustration and is not described herein.

The tape cassette 6 which can be loaded into the deck mechanism 1 is illustrated by way of example in FIG. 6.

The cassette housing 6a of the tape cassette 6 has an open recess 6d defined in a bottom panel 6b thereof and contiguous with a front open side 6c of the cassette housing 6a. The supply and take-up reels 8a, 8b in the cassette housing 6a are rotatably supported on respective reel holders 9a, 9b which are disposed in the cassette housing 6a in front of the open recess 6d. The reel holders 9a, 9b are swingably supported in the cassette housing 6a by respective shafts P1, P2, so that the reel holders 9a, 9b are angularly movable toward and away from each other. The supply and take-up reels 8a, 8b have respective central holes 8a1, 8b1 opening downwardly for receiving respective shafts of the reel supports 11, 12 when the tape cassette 6 is loaded in the first chassis 2.

When the tape cassette 6 is loaded in the first chassis 2, the shafts Pl, P2 about which the reel holders 9a, 9b are swingable with respect to the cassette housing 6a are axially aligned with the respective shafts 34, 35 about which the reel supports 11, 12 are angularly movable with respect to the first chassis 2.

The cassette housing 6a also houses a lock member 10 in a rear portion thereof (i.e., on the side opposite the lid 7), for locking the reels 8a, 8b and the reel holders 9a, 9b in position. The lock member 10 is normally urged resiliently in a forward direction to lock the reels 8a, 8b and the reel holders 9a, 9b. At this time, the front end 10a of the lock member 10 is located across a cavity 6e formed in the rear edge of the open recess 6d in the bottom panel 6b. When the tape cassette 6 is loaded in the first chassis 2 and the unlock member 40 is inserted into the cavity 6e, the presser 40a (FIG. 2) of the unlock member 40 pushes the front edge 10a (FIG. 6) of the lock member 10 against the resilient forces applied thereto, thus unlocking the reels 8a, 8b and the reel holders 9a, 9b, which are now free to rotate.

The bottom panel 6b of the cassette housing 6a also has a pair of recesses 6f1, 6f2 defined therein near rear corners thereof and contiguous to the recess 6d, for receiving the respective reels 8a, 8b. The recesses 6f1, 6f2 extend partly along the paths of movement of the swingable reel holders 9a, 9b.

FIG. 7 shows the tape cassette 6 with the rotary head drum 16 and the tape loading mechanism 15 inserted in the increased accommodation space provided in the cassette housing 6a. After the lid 7 is closed, the magnetic tape T in the tape cassette 6 is loaded around the rotary head drum 16 by the tape loading mechanism 15, preparing the recording and reproducing heads on the rotary head drum 16 to record signals on and reproduce signals from the magnetic tape T.

FIGS. 8A through 8F show a mechanism for opening and closing the lid of a tape cassette, according to another embodiment of the present invention.

The lid opening and closing mechanism shown in FIGS. 8A through 8F employs a sector gear for opening the lid of a tape cassette. More specifically, a deck mechanism 1 includes a loading unit la in the form of a casing for loading a tape cassette 6 therein. A sector gear 62 is rotatably mounted on a side wall panel of the loading unit la in a position corresponding to a side of the lid 7 of the tape cassette 6. The sector gear 62 is held in mesh with a drive gear 61 and angularly movable in one direction and the other (upwardly and downwardly). The sector gear 62 has on an upper inner surface thereof a presser pin 63 for engaging an arm or engaging portion 7a projecting rearwardly from the lid 7 of the tape cassette 7.

Figure 8A:
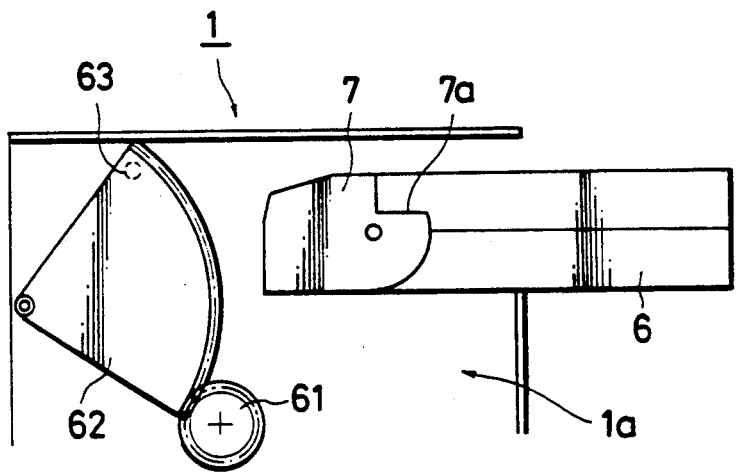
FIGS. 8A through 8F are schematic views in a vertical plane parallel to the front-to-back direction of both the tape cassette and the magnetic recording and reproducing device, showing another construction of a portion of the magnetic recording and reproducing device.
Figure 8B:
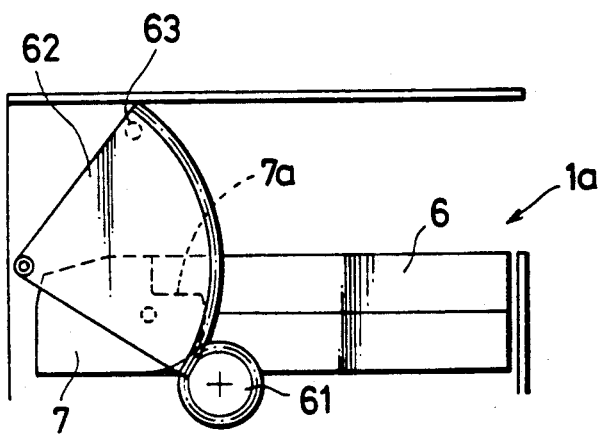
Figure 8C:
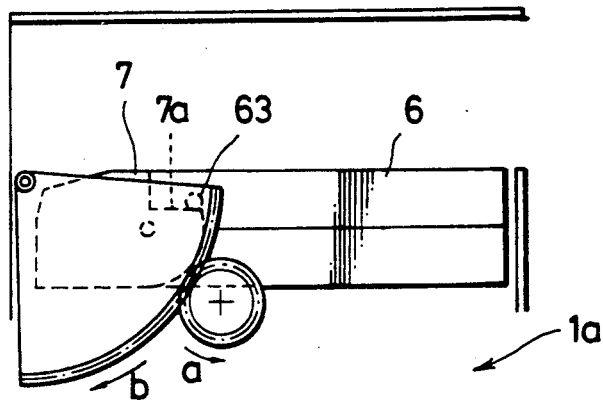

When the tape cassette 6 is inserted in into the loading unit la as shown in FIG. 8A and lowered into a predetermined position as shown in FIG. 8B, the drive gear 61 is rotated counterclockwise about its own axis in the direction indicated by the arrow a in FIG. 8C, causing the sector gear 62 meshing with the drive gear 61 to turn clockwise or downwardly in the direction indicated by the arrow b.

The presser pin 63 on the sector gear 62 is therefore brought into abutment with the arm 7a of the lid 7.

Figure 8D:
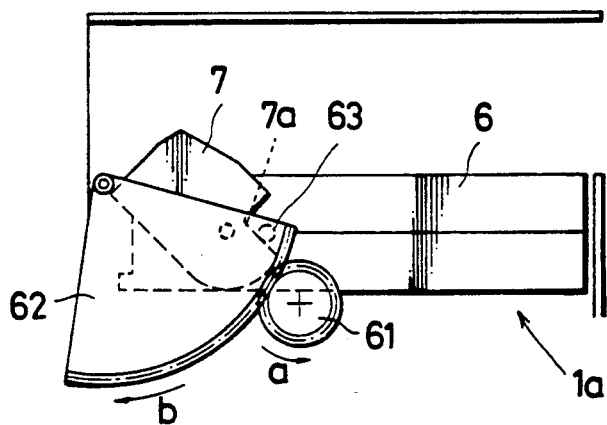
Figure 8E:
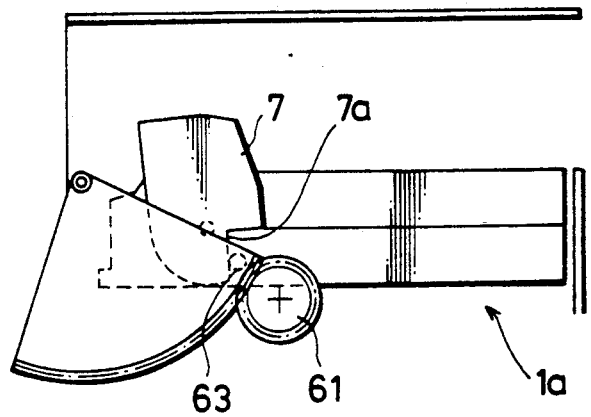

Upon further turning movement of the sector gear 62, the presser pin 63 presses the arm 7a to turn the lid 7 in an opening direction as shown in FIG. 8D. The lid 7 is fully opened when the sector gear 62 is turned to its downward limit position as shown in FIG. 8E. The drive gear 61 is now stopped, thereby stopping the sector gear 62 and holding the lid 7 in the fully open position. The rotary head drum and the tape loading mechanism are now inserted into the tape cassette 6, and the tape in the tape cassette 6 is loaded around the rotary head drum by the tape loading mechanism.

Figure 8F:
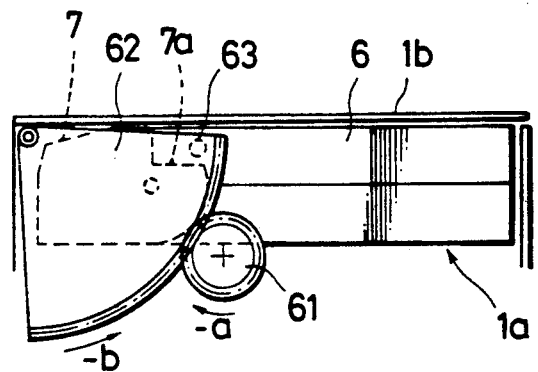
Figure 9B:
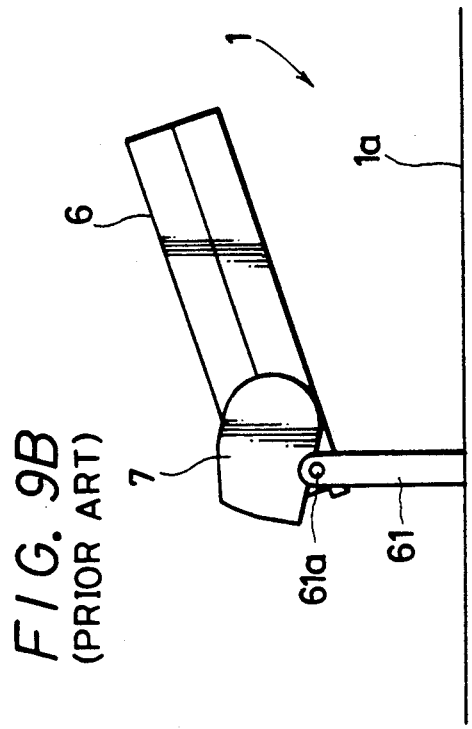
FIGS. 9A through 9D are schematic views similar to FIGS. 8A through 8F but showing the manner in which the lid of a conventional tape cassette is opened and closed.
Figure 9D:
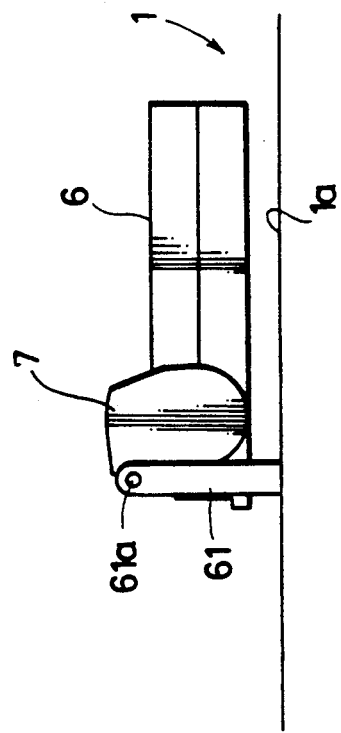
Figure 9A:
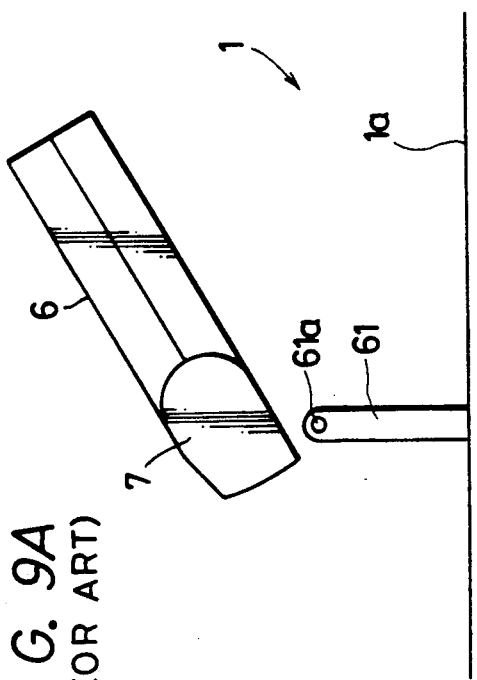
Figure 9C:
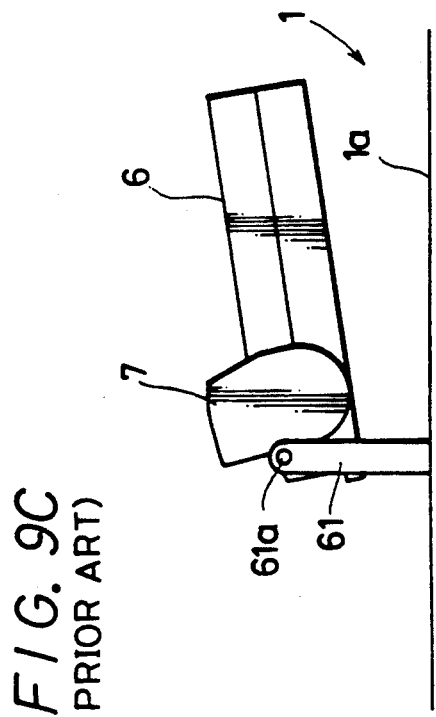

After the rotary head drum and the tape loading mechanism are completely inserted in the tape cassette 6, the drive gear 61 is rotated in the opposite direction (clockwise, as indicated by the arrow a in FIG. 8F), thereby turning the sector gear 62 counterclockwise or upwardly in the direction indicated by the arrow b, so that the lid 7 is released by the presser pin 63. The released lid 7 is automatically turned to close the front open side of the tape cassette 6 under its own bias. After the lid 7 is closed, the drive gear 61 is stopped, thereby stopping the sector gear 62 substantially in an intermediate angular position, whereupon the upper edge of the sector gear 62 lies substantially flush with the upper surface of the tape cassette 6 as shown in FIG. 8F.

Then, an upper panel 1b of the loading unit la is lowered toward the upper surface of the tape cassette 6. The loading unit la is now rendered compact in size. Signals can be recorded on and reproduced from the tape in the tape cassette 6 by the recording and reproducing heads of the rotary head drum inserted in the tape cassette 6.

With the present invention, as described above, a lid is angularly movable upwardly and downwardly to open and close a front open side or opening of a tape cassette for use in a VTR, an audio DAT, or the like, for the insertion of a rotary head drum and a tape loading mechanism and for the loading of a tape around the rotary head drum. The lid is opened by being pushed downwardly or, more generally, the applied force has a downward component. Therefore, when the lid of the tape cassette is opened for inserting the rotary head drum and the tape loading mechanism and for loading the tape around the rotary head drum, the cassette housing of the tape cassette is subjected to downward forces. Accordingly, the tape cassette is prevented from being lifted, and a member such as a cassette presser of the deck mechanism may be simplified in structure. The deck mechanism is thus simple in structure and small in size and weight.

Even if complex actions are necessary to open and close the lid of the tape cassette while the tape cassette is being loaded in the deck mechanism, the mechanism for carrying out such complex actions can be constructed with a greater degree of freedom or flexibility, and hence can be designed and manufactured with ease.

I claim:
1. A tape cassette comprising:
   housing means having a top and a bottom;
   a pair of reels;
   means mounting said reels for rotation in said housing means;
   a recording medium wound on said reels and extending therebetween for transport from one of aid reels to the other;
   said housing means being formed with an opening at a front thereof through which transducer means can gain access to said recording medium for re- cording or reproducing signals on or from said recording medium;

lid means; and connection means including a pair of pivot shafts for pivotably connecting said lid means to said housing means for selective movement of said lid means between a first position closing said opening and a second position uncovering said opening;

said lid means being formed with an engagement portion displaced from said connection means, whereby said tape cassette is moved by a seating force for playing in a cassette player, said lid means moves from said first position to said second position in response to a force applied to said engagement portion, the force being in substantially the same direction as said seating force, wherein said force is applied downwardly relative to the top of said housing means, said engagement portion is rearward of said pivot means relative to said front of said housing means, and a front portion of said lid means pivots upwardly in moving from said first position to said second position.

2. A tape cassette comprising;

housing means having a top and bottom;

a pair of reels;

means mounting said reels for rotation in said housing means;

a recording medium wound on said reels and extending therebetween for transport from one of said reels to the other;

said housing means being formed with an opening at a front thereof through which transducer means can gain access to said recording medium for recording or reproducing signals on or from said recording medium;

lid means; and connection means including a pair of pivot shafts for pivotably connecting said lid means to said housing means for selective movement of said lid means between a first position closing said opening and a second position uncovering said opening;

said lid means being formed with an engagement portion displaced from said connection means, whereby when said tape cassette is moved by a seating force for playing in a cassette player, said lid means moves from said first position to said second position in response to a force applied to said engagement portion, the force being in substantially the same direction as said seating force, wherein said force is applied downwardly relative to said top of said housing means, said engagement portion is forward of said pivot means toward said front of said housing means, and a front portion of said lid means pivots downwardly in moving from said first position to said second position.

* * * * *

UNITED STATES PATENT AND TRADEMARK OFFICE
CERTIFICATE OF CORRECTION

PATENT NO. : 5,191,496

DATED : March 2, 1993

INVENTOR(S) : Kondo

It is certified that error appears in the above-identified patent and that said Letters Patent is hereby corrected as shown below:

```
Col. 6, line 38, after "distance" insert --.--
Col. 8, line 38, after "each" insert --other.--

Col. 10, line 64, change "aid" to --said--
```

Signed and Sealed this

Tenth Day of May, 1994

Attest:

BRUCE LEHMAN

Attesting Officer     Commissioner of Patents and Trademarks